April 3, 1928. 1,664,478
J. A. LUKE
SPRING SUSPENSION FOR VEHICLES
Filed Aug. 5, 1927
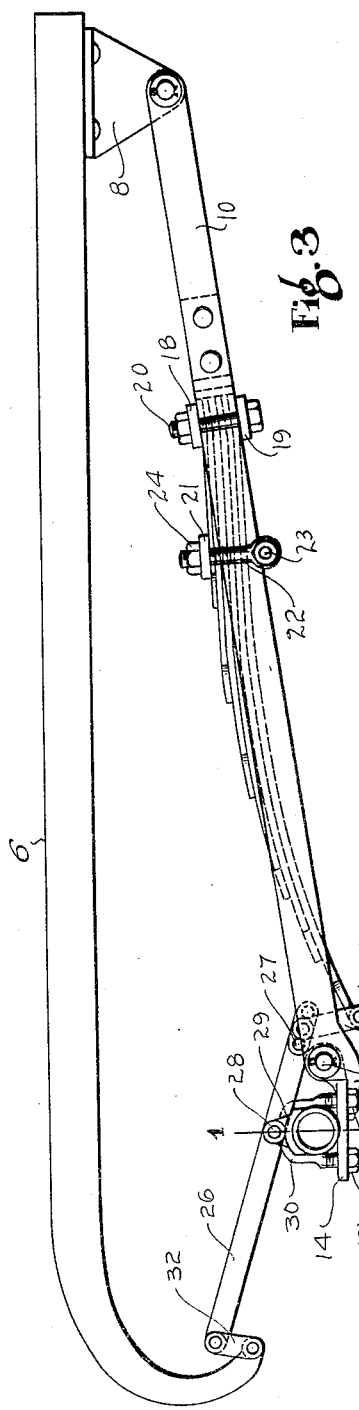
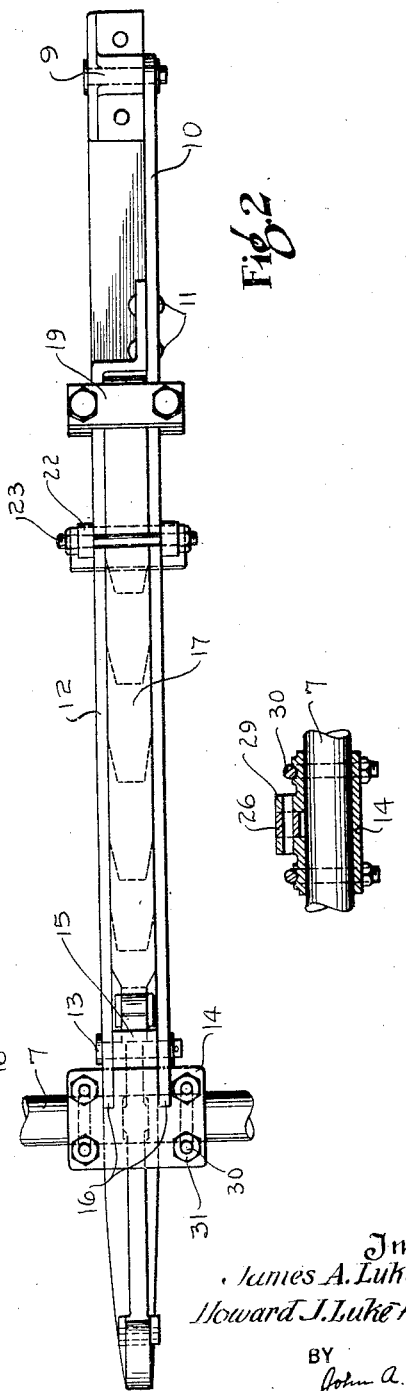
Inventor
James A. Luke – Deceased
Howard J. Luke Administrator
BY
John A. Bennerhardt
ATTORNEY Patented Apr. 3, 1928.

1,664,478

UNITED STATES PATENT OFFICE.

JAMES A. LUKE, DECEASED, LATE OF CLEVELAND, OHIO, BY HOWARD J. LUKE, ADMINISTRATOR, OF CLEVELAND, OHIO.

SPRING SUSPENSION FOR VEHICLES.

Application filed August 5, 1927. Serial No. 210,887.

This invention relates to improvements in spring suspensions for vehicles and has for its object to provide an improved connection which will have shock absorbing effects, as well as an adjustment for varying the tension of the spring and for varying the adjustment of the lever by which the spring is connected to the axle and the frame of the vehicle. A further object is to provide an improved connection between the axle and the spring, or rather the pivoted frame which carries the spring. A further object is to improve the connection of springs of the cantilever type to a frame and axle.

One form of the invention is shown in the accompanying drawing in which Fig. 1 is a sectional view of the axle connection, on the line 1—1 of Fig. 3. Fig. 2 is a bottom view of the spring and connections. Fig. 3 is a side view thereof.

In the drawings, 6 indicates one of the frame members and 7 the axle casing, the device being particularly adapted for rear suspension. A bracket 8 is fixed to the frame, and pivoted to the bracket by pin 9, is a vertically swinging arm or frame 10, which acts as a distance piece, and secured to the side of this arm, as by rivets 11, is a companion arm or piece 12 which is spaced from the arm 10 and extends parallel thereto, and the rear ends of both arms are connected to the axle clip by a pivot pin 13.

The axle clip consists of a bottom plate 14 having a pivot lug or projection 15 which fits between the rear ends of the arms 10 and 12 and through which the connecting pin 13 extends. The rear end of each arm 10 and 12 has a finger 16 which extends under the plate 14 and is adapted to stop against the same to limit the upward movement at the joint 13. Under all conditions the arms 10 and 12 form a radius rod or connection which holds the rear axle at a certain distance from the front connection, and forms a thrust bar that takes the driving thrust of the wheels.

The leaf spring 17 is positioned between the arms 10 and 12, and is retained thereby against lateral distortion. It is fastened to the arms at its front end by a clip consisting of top and bottom plates 18 and 19 and connecting bolts 20, embracing the end of the spring between the arms. The tension of the spring may be varied, by a clip consisting of a plate 21 resting on top of the spring and connected by a pair of eye-bolts 22 to a cross bolt 23 under the arms 10 and 12, the eye-bolts receiving nuts 24 which may be adjusted to vary the pressure or tension of the spring. This tension adjusting clip is preferably located at a distance from the fixed clip about a fourth the length of the spring.

The carrier or lower leaf of the spring is connected by a link 25 to the short arm of a lever 26, the leverage being adjustable by connecting the link at one of a series of holes 27 in the end of the lever. The lever is fulcrumed by a pin 28 between a pair of caps 29 forming part of the rear axle clip, and these caps are clamped to the axle casing by a pair of U-bolts 30 which span the casing and extend through holes in the bottom plate 14 where they are fastened by nuts 31. The rear end of the lever 26 is connected by shackles or links 32 to the rear curved end of the body frame 6.

Under weight on the body frame 6 the lever 26 rocks on its pivot 28 and the spring 17 is placed under tension, thereby supporting the sprung weight of the vehicle as well as absorbing the rise and fall of the axle incident to road shocks. The spring is free to vibrate between the arms 10 and 12, but these arms preserve the relative distance between the front connection with the frame and the axle, so that the relative position of the axle with respect to the longitudinal axis of the vehicle does not change and the arms take the driving thrust, no part of which is sustained by the spring, the swinging link 25 permitting elongation of the spring incident to its vibration. The pivotal connection at 13 permits the joint to "break" downwardly, on the rebound, but the fingers 16 stop against the plate 14 on impact or under excessive weight, which is then taken up by the spring and its lever connection.

It will be noted that the driving thrust is not transmitted through the spring, but through the swinging frame, the spring itself being subjected only to the load and the road impacts. This preserves the alinement and position of the rear axle. The leverage may be adjusted according to the expected weight and acts independently of the distance members.

The whole permits the use of relatively light springs and frames and effects improved spring suspension for springs of the type referred to.

What is claimed is:

1. The combination with a body frame and axle, of a thrust frame pivotally connected between the body frame and the axle, a spring fixed to the thrust frame, and a lever and link connection between the body frame and the spring, the lever being fulcrumed upon the axle.

2. The combination stated in claim 1, the connection between the thrust frame and the spring being adjustable to vary the tension of the spring.

3. The combination stated in claim 1, the connection between the lever and the spring being adjustable to vary the leverage.

4. The combination of a body frame, an axle, a thrust frame pivotally connected at its front end to the body frame and at its rear end to the axle, the thrust frame having a projection at its rear end engageable under the axle when the axle rises to a certain extent, a spring fixed to the thrust frame, and a lever connecting the spring, the axle and the body frame.

5. The combination of a body frame, an axle, a thrust frame pivotally connected between the body frame and the axle, a spring fixed at one end to the thrust frame, an adjustable tension clip between the spring and the thrust frame, and a lever and link connection between the end of the spring and the body frame, the lever being fulcrumed on the axle.

6. In a rear spring suspension for vehicles, the combination of a body frame, an axle casing, a thrust frame pivoted at its front end to the body frame and at its rear end to the axle casing, a leaf spring fixed at its front end to the thrust frame, and a lever extending across and fulcrumed on the axle casing, said lever being pivotally connected at its front end to the rear end of the spring and at its rear end to the body frame.

7. A spring suspension for vehicles comprising the combination of a body frame, an axle, a thrust frame pivotally connected at its opposite ends to the body frame and the axle, said thrust frame having parallel arms, a spring fixed to the thrust frame and extending between said arms, and a lever and link connection between the free end of the spring and the body frame, the lever being fulcrumed on the axle.

8. The combination of a body frame, an axle casing, a clip on the casing, a thrust frame pivoted at its front end to the body frame and at its rear end to said clip, a spring fixed to the thrust frame and extending parallel thereto, and a lever fulcrumed on the clip and connected at its opposite ends to the spring and body frame respectively.

9. The combination of a vehicle body frame, an axle casing, a clip on the casing including a bottom plate and a cap, a thrust frame pivoted at its front end to the body frame and at its rear end to said bottom plate and having a projecting finger adapted to contact with the under side of the bottom plate, a lever fulcrumed on the cap, and link connections between the lever and the spring and the lever and the body frame.

In testimony whereof, I do affix my signature.

HOWARD J. LUKE,
*Administrator of estate of James A. Luke, deceased.*